United States Patent
Matsui

[19]
[11] Patent Number: 6,137,959
[45] Date of Patent: Oct. 24, 2000

[54] APPARATUS FOR CONTROLLING A LIGHT SOURCE USED IN CONJUNCTION WITH THE OPERATION OF AN IMAGING DEVICE

[75] Inventor: Hideki Matsui, Fujisawa, Japan

[73] Assignee: Nikon Corporation, Tokyo, Japan

[21] Appl. No.: 09/136,603

[22] Filed: Aug. 19, 1998

[30] Foreign Application Priority Data

Aug. 20, 1997 [JP] Japan ................................ 9-223649

[51] Int. Cl.⁷ .......................... G03B 13/00; G03B 15/03; G03B 17/18
[52] U.S. Cl. .......................... 396/108; 396/147; 396/158; 396/286; 396/281
[58] Field of Search .................................. 396/106, 108, 396/147, 286, 296, 157, 158, 281

[56] References Cited

U.S. PATENT DOCUMENTS

| | | | |
|---|---|---|---|
| 4,327,976 | 5/1982 | Kagechika | 396/106 |
| 4,801,962 | 1/1989 | Akashi | 396/106 |
| 5,065,177 | 11/1991 | Yamamoto et al. | 396/106 |
| 5,448,331 | 9/1995 | Hamada et al. | 396/106 |
| 5,530,512 | 6/1996 | McIntyre | 396/106 |
| 5,546,156 | 8/1996 | McIntyre | 396/106 |
| 5,822,624 | 10/1998 | Fukuhara et al. | 396/158 X |

FOREIGN PATENT DOCUMENTS 7-281079  10/1995  Japan .

*Primary Examiner*—W. B. Perkey
*Attorney, Agent, or Firm*—Erik B. Cherdak & Associates, LLC.

[57] ABSTRACT

An apparatus and method for controlling a light source that is used during operation of an imaging device (e.g., a camera) and, in particular, during operation of a camera feature/subsystem such as an AF subsystem, a red-eye reduction subsystem, a self-timer subsystem, etc. The apparatus and method include and involve a light source which is configured to emit light in relation to the operation of a subsystem of an imaging device, and a light source control unit which is configured to control an amount of light emitted by the light source based on a preset operating parameter (e.g., a user-selectable camera setting). The apparatus and method may be included within an imaging device such as a camera or in a peripheral (e.g., a flash unit, etc.) configured to operate with such a camera.

18 Claims, 7 Drawing Sheets

LIGHT EMISSION SIGNAL
FOR AF AUXILIARY LIGHT

APPARATUS FOR CONTROLLING A LIGHT SOURCE USED IN CONJUNCTION WITH THE OPERATION OF AN IMAGING DEVICE

BACKGROUND OF THE INVENTION

1. Field of the Invention

The present invention relates to cameras and other imaging devices that utilize light sources to facilitate the operation of camera features. More particularly, the present invention relates to light sources used by camera subsystems such as automatic focusing systems, red-eye reduction systems, self-timers, etc. to perform their respective operations.

2. Description of the Related Art

Cameras that utilize automatic focussing subsystems and electronic flash devices are well known. For example, a camera that incorporates and utilizes an electronic flash device is shown and described in Japanese Examined Patent JP-B-49-19810, and in Japanese Laid-Open Patent JP-A-62-144123. A camera having an automatic focussing system and flash arrangement is further illustrated in a drawing figure that is attached hereto which has been identified as "FIG. 1." In FIG. 1, a camera 71 is shown in conjunction with an electronic flash device 72 which is mounted on camera 71 via a conventional "hot shoe" mounting system HS. In electronic flash device 72, a light emitting diode 73, a projection screen 74, and a projection lens 75 are arranged in a row facing a subject 80 which is to be imaged (e.g., a potted plant) by camera 71. Light emitting diode 73 is connected to a control circuit (not shown in the drawing) which is disposed in the electronic flash device 72. Light emitting diode 73 is used during automatic focussing operations prior to an actual imaging operation by camera 71 to ensure a proper focus state of an optical system of camera 71.

Normally, a focus detection unit 76 within camera 71 is used to facilitate automatic focussing (also referred to as "autofocus" or "AF") operations. Focus detection unit 76 utilizes a well-known divided-pupil phase-difference detection system and method to effect autofocus operations. In particular, the optical system in focus detection unit 76 causes a pair of images formed via a divided-pupil arrangement (not shown) to become incident on a light-receiving element array (not shown) in focus detection unit 76. In turn, the light-receiving element array photo-electrically converts the pair of optical images formed thereon into corresponding electrical signals. In turn, camera 71 detects an amount of displacement of a photographic lens from a desired/acceptable focus state by determining a phase difference between the photo-electric output signals generated by the light receiving element array. Such an automatic focussing system will be immediately apparent and understood by those skilled in the art.

Under abnormal conditions, such as when the contrast of a subject 80 is low, subject luminosity will be insufficient for focus detection unit 76 to accurately perform autofocus operations. As such, focus detection accuracy of focus detection unit 76 decreases. Accordingly, camera 71 can detect such a decrease in focus detection accuracy by determining decreased outputs of the light receiving element array. Accordingly, when camera 71 detects a decrease in focus detection accuracy, it may generate a light emission signal to cause light emitting diode 73 to illuminate.

Based on the aforementioned light emission signal, the light emitting diode 73 is caused to illuminate to produce additional light to aid in autofocus operations of focus detection unit 76. In turn, the light emitted by light emitting diode 73 passes through projection screen 74 and projection lens 75 to become incident on subject 80. The light generated by light emitting diode 73 that becomes incident on subject 80 is in the form of a projected pattern 81 which consists of light and dark stripes (as shown in FIG. 1). Focus detection unit 76 may perform autofocus operations based on projected pattern 81 with very high accuracy.

Although the generation of additional light by light emitting diode 73 will facilitate autofocus operations by focus detection unit 76 during poor lighting conditions, such additional light illuminates for about 0.3–1.0 seconds in the wavelength band of 660–700 nm. In situations where flash unit activation is not necessary (or not desired) to perform photographic operations, such additional light often unexpectedly enters and causes the eyes of a subject to close. As such, photographs are often ruined due to the emission of additional light which causes a subject's eyes to close or squint during imaging operations. Also, in circumstances in which the generation of such additional light is undesirable (e.g., when taking pictures at a play or live performance, etc.), a photographer often abandons AF type photography and elects to engage in manual focus adjustment as there is no way to prevent his camera from generating such additional AF illumination light. Depending on circumstances, manual focus adjustment can cause undesirable and lost images.

Thus, there exists a need to provide a new and improved apparatus and method for controlling a light source used in conjunction with an automatic focussing system. Such an apparatus must allow a light source to be controlled (e.g. turned off, dimmed, etc.) during otherwise poor lighting conditions to facilitate effective operation of an automatic focussing system. To be viable, such an apparatus must allow automatic focussing operations within an imaging device such as a camera to occur without impeding other imaging operations.

SUMMARY OF THE INVENTION

The present invention has as its principal object to solve the aforementioned problems associated with prior systems used to provide illumination for the operation of an imaging device such as a camera and, in particular, subsystems thereof.

It is another object of the present invention to provide an apparatus for preventing a light source from illuminating light during imaging operations.

It is a further object of the present invention to provide an apparatus for preventing a light source from illuminating light based on a camera operation setting desired and defined by a photographer.

It is still another object of the present invention to provide an apparatus for controlling an amount of light that may be emitted by a light source during camera operations.

It is a further object of the present invention to provide an apparatus for controlling an amount of light that may be emitted by a light source based on a camera operation setting desired and defined by a photographer.

It is still another object of the present invention to provide a method for controlling an amount of light that may be emitted by a light source during camera operations as desired and defined by a photographer.

These and other objects of the present invention are achieved by providing an apparatus and method for controlling a light source that is used during operation of an imaging device such as a camera. The apparatus and method include and involve a light source which emits light to affect operation of a subsystem of imaging device (e.g., an automatic focussing system, a self-timer system, a red-eye reduction system, an exposure setting system, etc.) and a light source control unit which controls an amount of light emitted by the light source (e.g., turned off, dimmed etc.) based on a user-defined operating parameter (e.g., a user-selectable and definable camera setting that is intended to affect operation of the light source). The apparatus and method may be included within an imaging device including, but not limited to, a camera or other camera peripheral.

BRIEF DESCRIPTION OF THE DRAWING FIGURES

The present invention is described below with reference to the following drawing figures, of which:

DETAILED DESCRIPTION OF THE PREFERRED EMBODIMENTS

Figure 1:
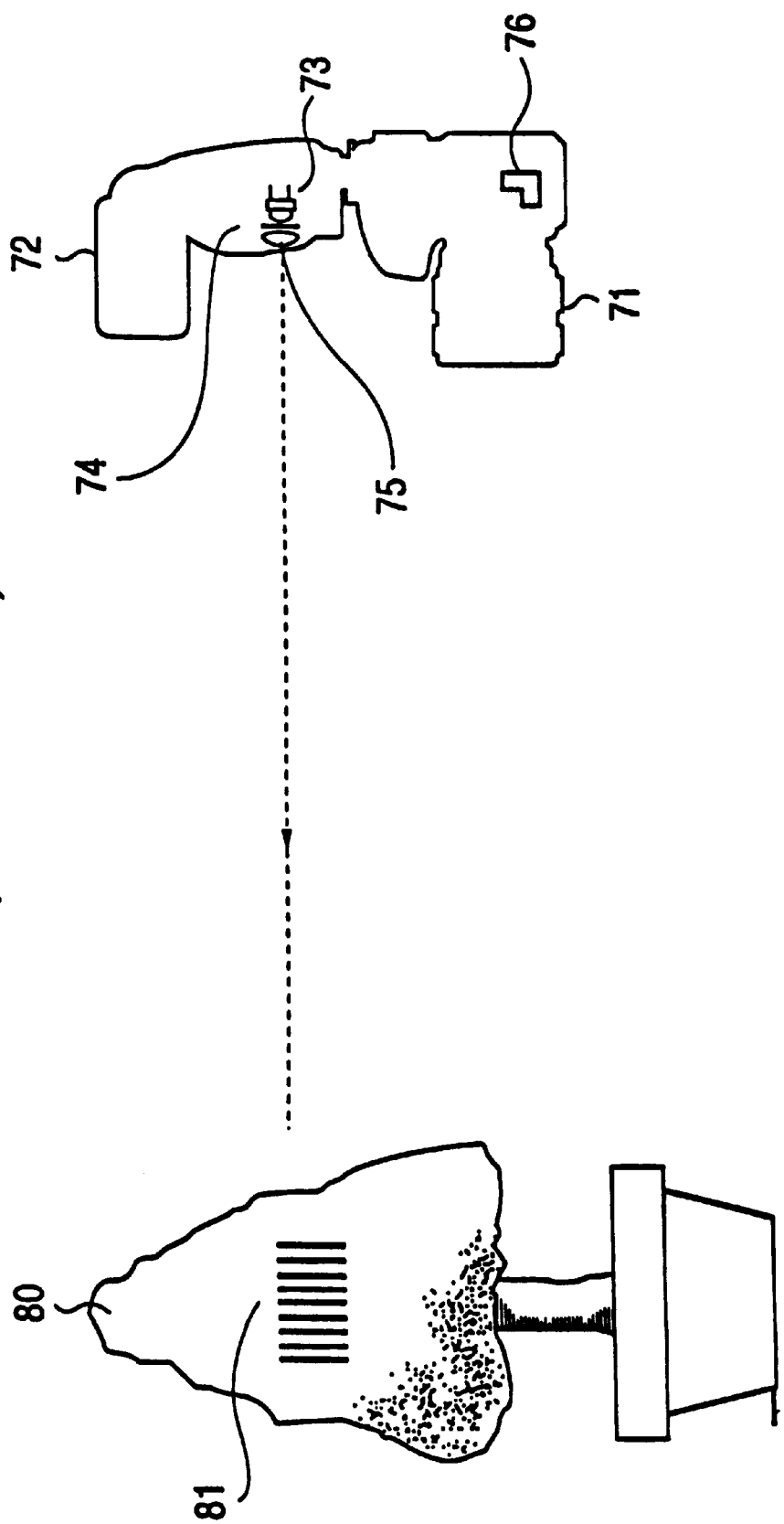
FIG. 1 is a diagram of a camera and electronic flash device arrangement in operation according to the prior art (as discussed above)

The present invention is now discussed with reference to the drawing figures that were briefly described above. A discussion of each preferred embodiment of the present invention is followed by a corresponding discussion of its corresponding operation. Unless otherwise specified, like parts are referred to with like reference numerals.

In the following paragraphs, reference is made to autofocus (AF) subsystems and illumination systems which may be used to facilitate AF operations within a camera. However, the present invention is not so limited. In fact, other camera subsystems to support other operating features including, but not limited to, red-eye reduction, self-timer delayed exposure operation, automatic exposure setting operations, etc. may be combined with the novel aspects of the present invention to provide imaging devices that are more effective and user-friendly than prior devices. In particular, camera subsystems that utilize light sources to emit light in relation to the operation of such subsystems can now be operated (such as prior to imaging operations with or without extra light emission in accordance with the present invention. For example, a self-timer subsystem of a camera may now take advantage of the present invention by including a light source that can be controlled to emit less or no light during situations where such lighting would be inappropriate or disruptive (e.g., during a live performance of a play at a theatre, etc.). Also, a red-eye reduction unit can take advantage of the present invention to utilize a light source that may be dimmed so as not to cause undue attention and disruption such as commonly realized with prior red-eye reduction light sources.

As such, camera subsystems that utilize light sources (e.g., light emitting diodes, light bulbs, etc.) during their operation (e.g., such as prior to an actual imaging operation of a camera) may now be caused to operated without having a light source emit light which may cause disruption, etc. For example, an automatic focus (AF) system of a camera may now be caused to operate without the emission of AF illumination light in the form of a patterned light projection onto a subject. Such patterned light projection (e.g., such as done by projection of light emitted by a light emitting diode in conjunction with a projection mask, etc.) can be quite disruptive during live performances at a theatre. In accordance with the present invention, such light emission may be avoided while still allowing an AF subsystem to operate (albeit possibly under less-than-desired lighting conditions and in accordance with reduced accuracy requirements).

Additionally, many self-timer features of cameras emit pulses of light (such as by a light emitting diode) to indicate that an automatic timer is running and an imaging operation (exposure) is about to occur. Now, such self-timer features may take advantage of the present invention to allow a photographer to turn off or otherwise cause a light source to be dimmed during self-timer count-downs.

As such, the present invention allows camera subsystems that normally require the emission of some form of light during their operation prior to an actual imaging operation (e.g., light pulses to indicate the countdown of a self-timer feature), to operate without requiring such light emission. Photographers and others will benefit from such functionality as cameras can now be used in more situations such as during live performances where flashing lights from cameras, are often disruptive.

Figure 2:
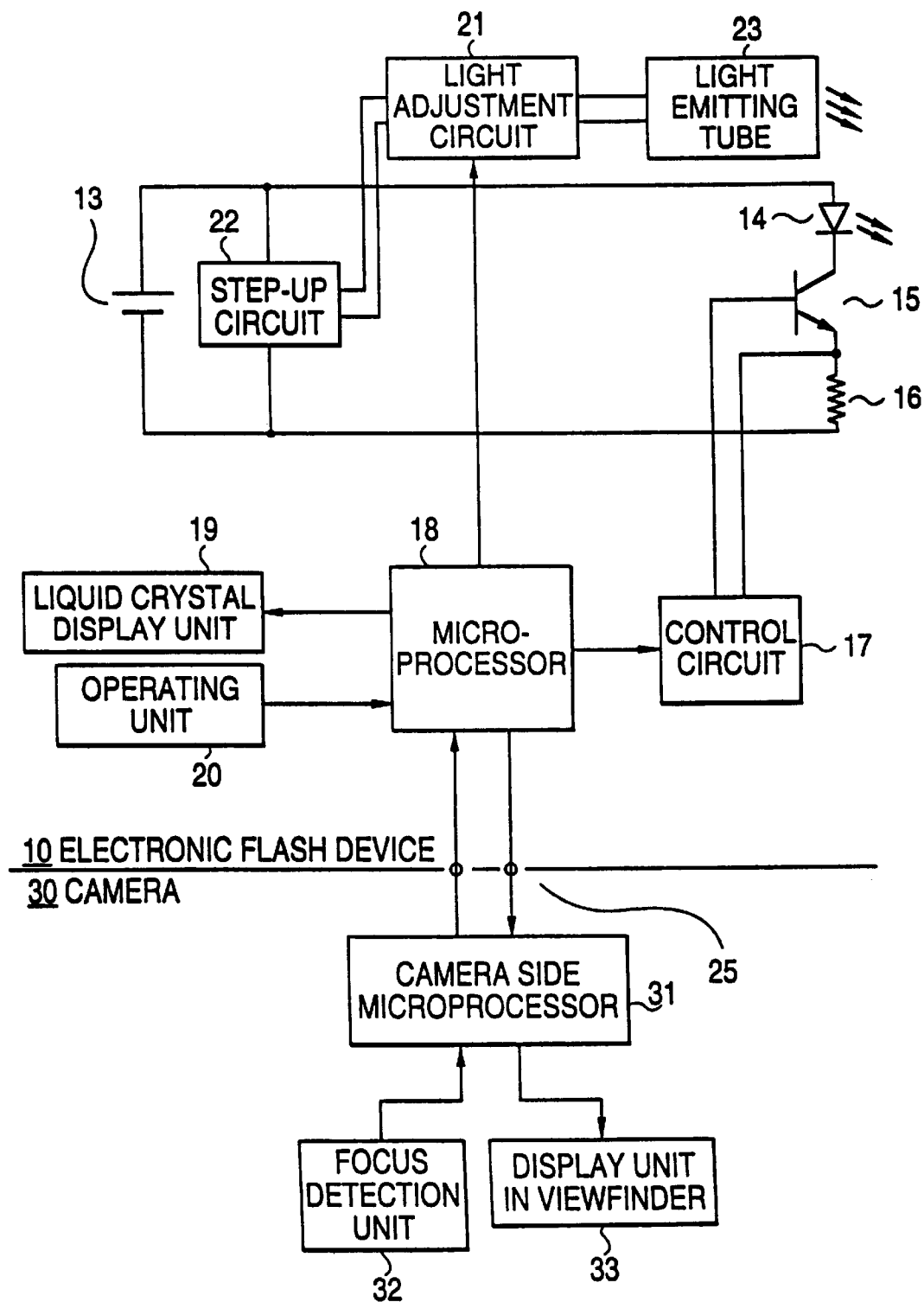
FIG. 2 is a block diagram of an apparatus for controlling a light source used in conjunction with a camera subsystem (e.g., an AF system) according to a first preferred embodiment of the present invention.
Figure 3:
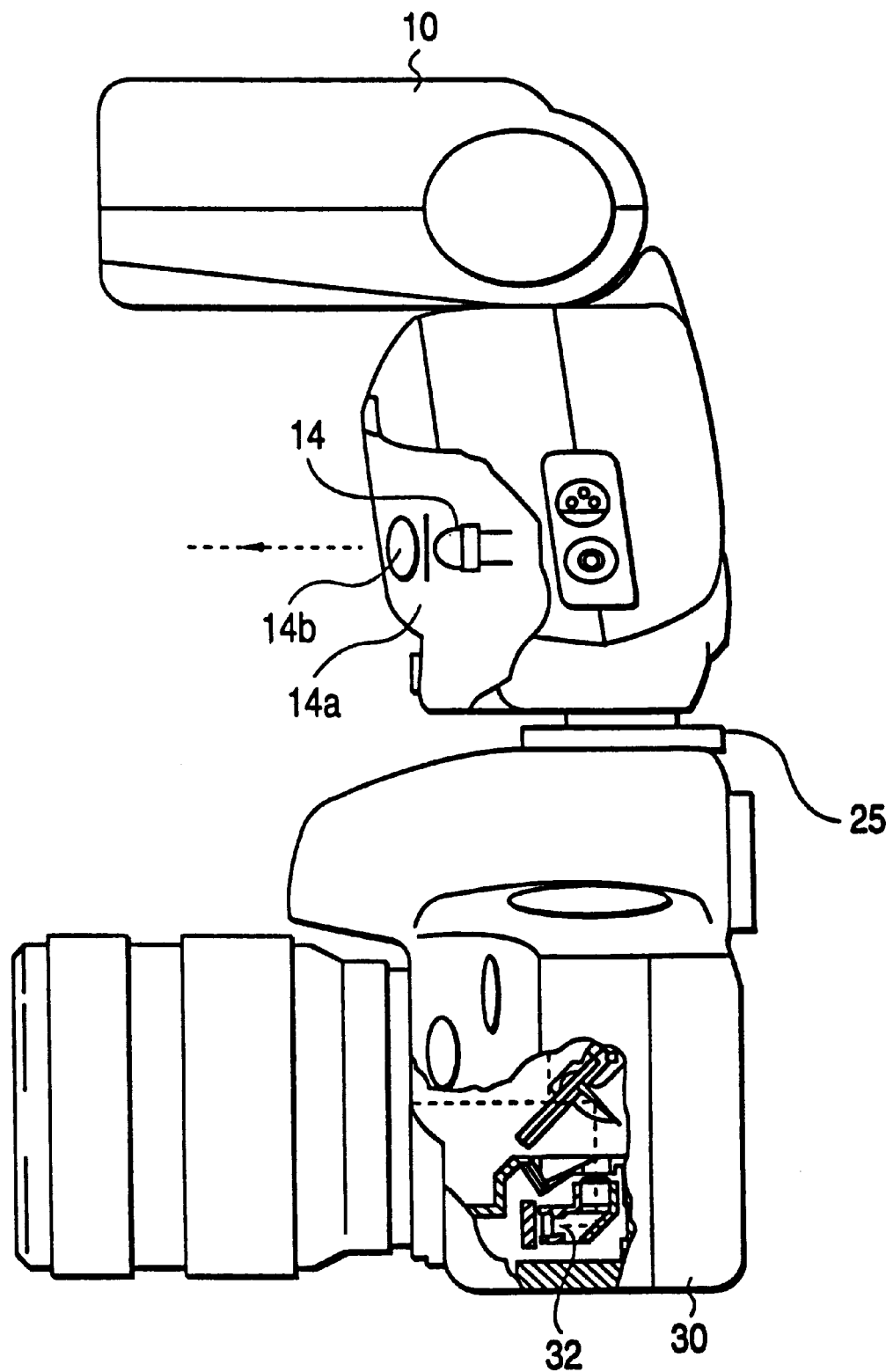
FIG. 3 is a diagram of a camera and electronic flash device arrangement which incorporates the structures shown in FIG. 2.
Figure 4:
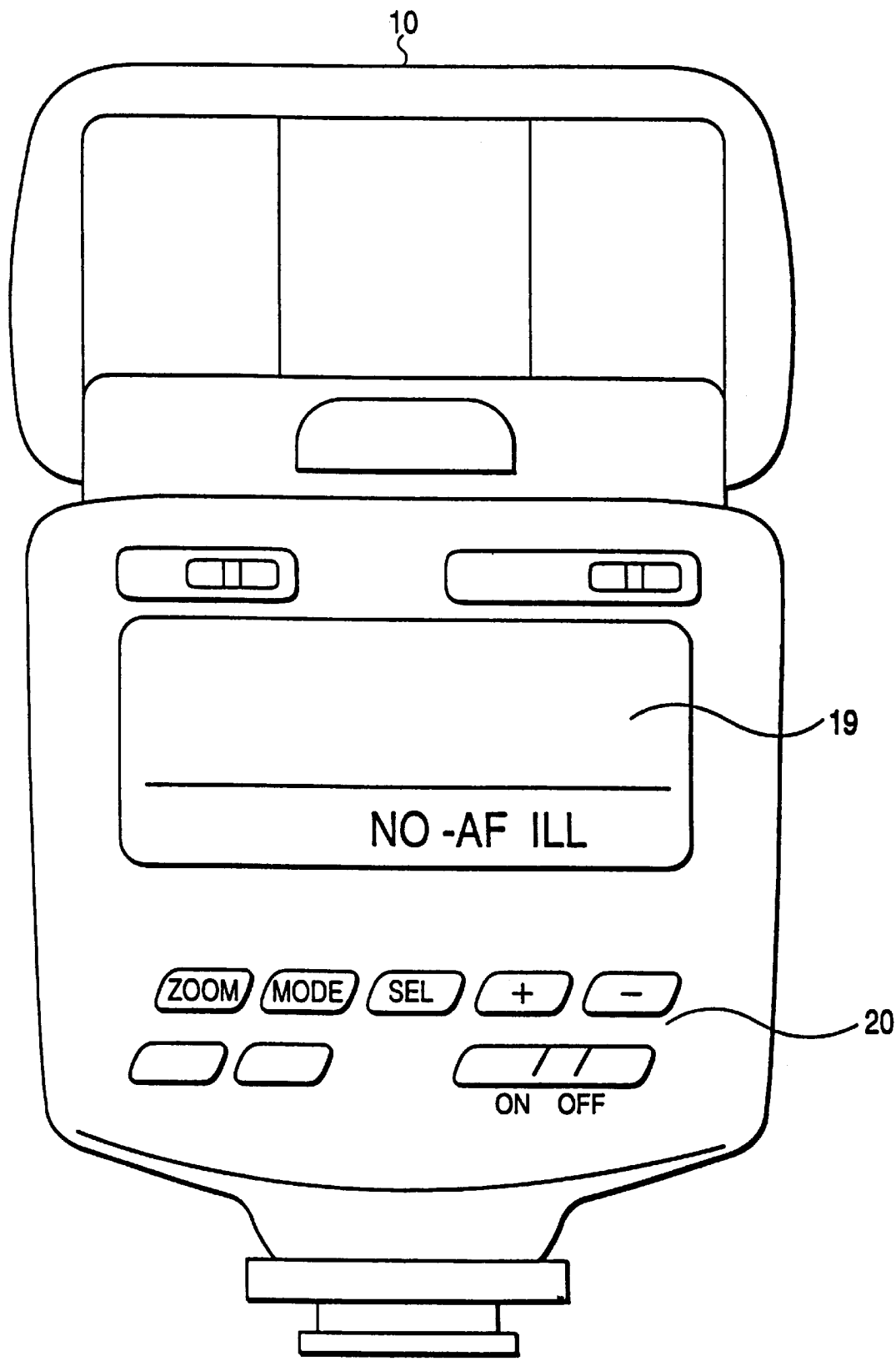
FIG. 4 is a diagram of the back surface of the electronic flash device illustrated in FIG. 3.

Accordingly, a first preferred and exemplary embodiment of the present invention is illustrated in FIGS. 2–4 to which reference is now made. In particular, in FIGS. 2–4, an apparatus for controlling a light source used in conjunction with an AF system is illustrated. More particularly, a collector of a transistor 15 is connected to a positive side of a battery 13 within electronic flash device 10. The collector of transistor 15 is connected to battery 13 via a light emitting diode 14. A projection screen 14a and a projection lens 14b are arranged in the light emitting direction (emission direction) of light emitting diode 14 (as shown in FIG. 2). Light emitting diode 14 along with projection screen 14a and projection lens 14b constitute a light source that can emit light (e.g., AF illumination light) used to facilitate automatic focussing ("autofocus" or "AF") operations by an AF subsystem of a camera 30, especially during otherwise poor lighting conditions.

An emitter of transistor 15 is connected to a terminal of a resistor 16 and to a voltage input of a control circuit 17. The other terminal of resistor 16 is connected to a ground connection of battery 13. The output terminal of control circuit 17 is connected to the base of transistor 15. A light emission signal to cause light emitting diode 14 to emit light for AF operations by an AF subsystem may be applied to the control terminal of control circuit 17 by a microprocessor 18 within electronic flash device 10.

Transistor 15 along with control unit 17 and the operation of operating unit 20 in conjunction with microprocessor 18 allow light emitting diode 14 to be controlled and, in particular, to be turned off or otherwise affected (e.g., dimmed, etc.) to operate based upon particular design requirements and operational settings that may be selected during camera operations as described below.

A flash control signal from microprocessor 18 may be applied to a light adjustment control circuit 21. Light adjustment control circuit 21 controls an electrical connection of a step-up circuit 22 and a light emitting tube 23 for flash unit operations which will be immediately understood by those skilled in the art.

Additionally, a liquid crystal display unit 19 and an operating unit 20 (which may be arranged at the back surface side of electronic flash device 10, etc. as shown in FIG. 3) are connected to microprocessor 18, respectively.

Communication terminals of microprocessor 18 are connected via a shoe connector 25 (FIG. 2) (also referred to as a "hot-shoe") to a camera-side microprocessor 31 within a camera 30. A focus detection unit 32 (e.g., an AF subsystem) and a display unit 33 (in camera 30's viewfinder, etc.), also are connected to camera-side microprocessor 31, respectively.

In operation, a photographer may desire to prevent (e.g., turn off, etc.) the operation of light emitting diode 14 prior to a particular photographic or imaging operation (e.g., during a play or other live performance at a theatre where the projection of illumination light onto a subject by light emitting diode 14 may be inappropriate and/or disruptive). If so, the photographer can use operating unit 20 to select a corresponding "NO-AF ILL" mode or parameter (e.g., a no autofocus illumination mode, etc) of camera operation. Such a user-defined type selection may be achieved (as indicated in FIG. 3) by manually operating both a MODE button and a MINUS key/button of operating unit 20 simultaneously.

When microprocessor 18 senses such a setting operation, it lights up the display "NO-AF-ILL" within liquid crystal display unit 19, and, in addition, sets an internal flag (processing flag) which corresponds to the "NO-AF" illumination mode selected and defined by the photographer. The internal flag is a processing flag which is reset every time the main power supply of the electronic flash device 10 is cycled.

In camera 30 and, in particular, in microprocessor 31, an AF photography mode or a focus aid mode, monitors, at fixed periods, the output level of a light receiving element array (not shown) within focus detection unit 32. When the output level (corresponding to subject luminosity, etc.) is less than threshold value, camera-side microprocessor 31 sends a light emission signal to microprocessor 18 within electronic flash device 10.

When microprocessor 18 receives the light emission signal sent from microprocessor 31, microprocessor 18 acquires the state of the aforementioned internal flag (corresponding to the photographic selection related to AF illumination light to be generated, for example, in otherwise poor lighting conditions. In the case that the internal flag is in a reset state, microprocessor 18 determines that the emission of AF illumination light by light emitting diode 14 is acceptable to the photographer, and applies the light emission signal to control circuit 17.

When control circuit 17 receives the light emission signal, it releases the output voltage which was originally set to a ground potential for a fixed period of time. During such a period time, control circuit 17 causes transistor 15 to return to a base voltage, so that the emitter voltage of transistor 15 coincides with a predetermined standard voltage. As a result, a constant current flows for a fixed period of time to light emitting diode 14 via the collector of the transistor 15. As such, light emitted by light emitting diode 14 passes through projection screen 14a and projection lens 14b, and is projected onto a subject to assist in AF operations by focus detection unit 32, especially during otherwise poor lighting conditions.

In particular, light emitted by light emitting diode 14 can be projected via projection screen 14a to form a projection pattern consisting of light and dark stripes, etc. Such a pattern may become incident on a surface of a subject to be photographed or otherwise imaged. Focus detection may be performed with high accuracy by focus detection unit 32 based on the projected pattern.

On the other hand, in the case that the internal flag is in a set state (i.e., the photographer desires no AF illumination light emission by light emitting diode 14), a light emission signal still is sent from camera-side microprocessor 31 to microprocessor 18. However, microprocessor 18 determines that such AF illumination light is to be prohibited as earlier selected and defined by the photographer (in accordance with the aforementioned internal flag).

Accordingly, microprocessor 18 does not apply a light emission signal for AF illumination light to control circuit 17. As a result, the output voltage of the control circuit 17 which is maintained at a normal ground potential, does not flow through the collector of transistor 15. As such, no AF illumination light is emitted by the light emitting diode 14. Thus, microprocessor 18 sends a signal indicating that no AF illumination is to occur to microprocessor 31.

Upon receipt of the aforementioned signal from microprocessor 18, a display unit 33 in camera 30 and, in particular, in a viewfinder thereof lights up a display informing the photographer that no AF illumination will occur. As such, the photographer can confirm or adjust/reset such a camera feature and, accordingly, an AF system operation parameter. Accordingly, display of such information within a viewfinder display in accordance with the present invention is very effective to inform a camera operator of a particular illuminating setting.

In any case, focus detection unit 32 performs focus detection regardless of whether AF illumination light is to be emitted. As such, focus detection unit 32 is capable of focus detection if the luminosity is about equal to 1 candle power. Accordingly, in the case that AF illumination light is not emitted, photoelectric accumulation time of a light receiving element array within focus detection unit 32 can become relatively long. As such, a sampling interval for focus detection can become long, thus causing the time taken to reach a particular focus state of an optical system to become rather slow. As such, it is preferable to configure microprocessor 31 to accept a wider range of focus states (e.g., accept a less-than focussed image, etc.) by reducing the focus detection accuracy of focus detection unit 32 in accordance with the prevention of the emission of AF illumination light. The setting of a focus recognition range may be reliably performed by camera-side microprocessor 31 in accordance with the no AF illumination signal sent back from microprocessor 18 as described above.

It should be noted that although the above-described preferred embodiment of the present invention has been applied to a camera device, the present invention is not so restricted. Other imaging devices such as video and digital still imaging devices may take advantage of the present invention and, in particular, incorporate light sources that may be controlled (e.g., turned off, etc.) based on user-definable and selectable subsystem operating parameters to affect camera subsystem operation such as a focus state of an optical system. Additionally, the present invention may be applied to imaging devices that incorporate built-in flash systems; there is no requirement that the light emitting diode (light source) be located or otherwise disposed in a separate electronic flash device.

Figure 5:
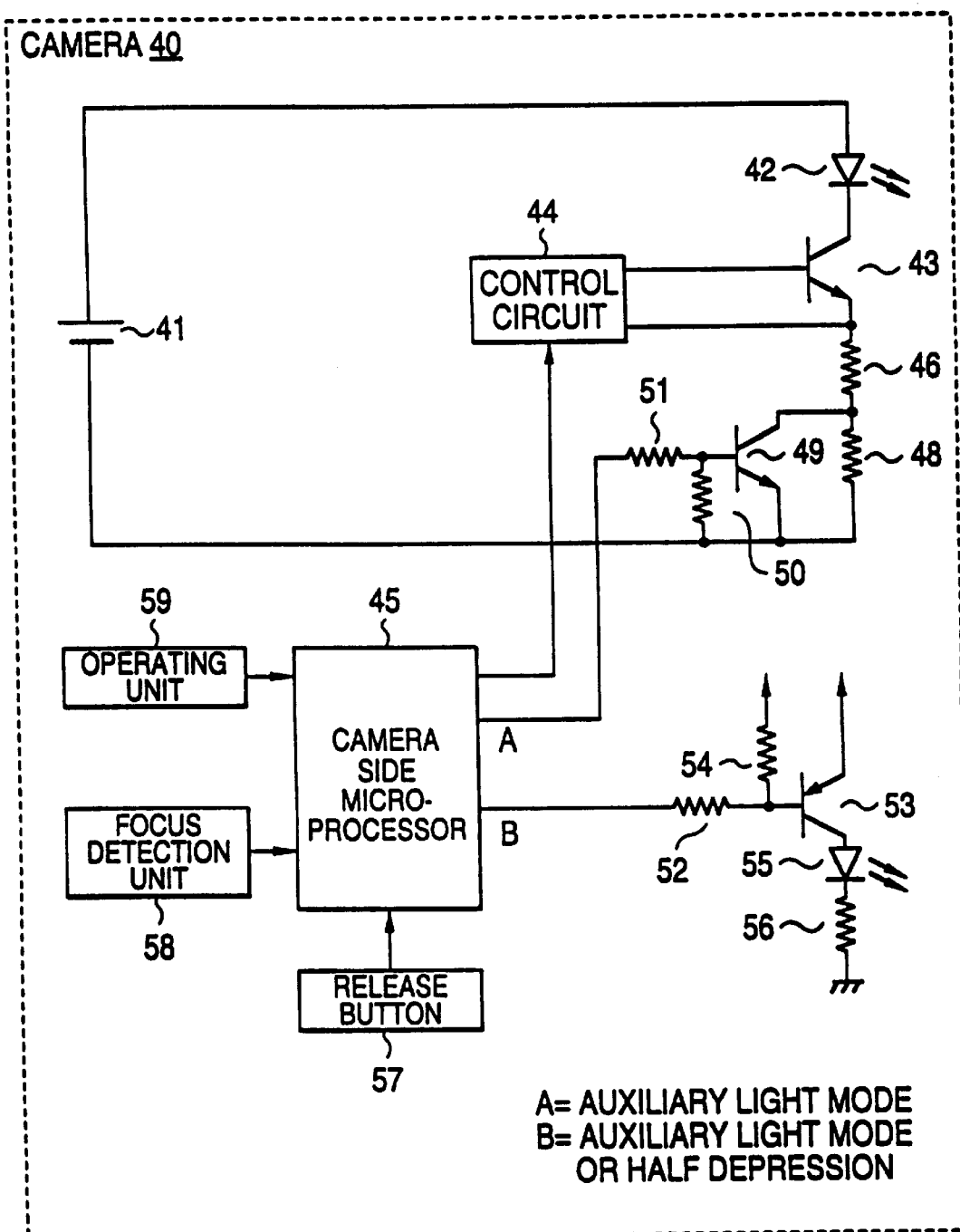
FIG. 5 is a block diagram of an apparatus for controlling a light source used in conjunction with a camera subsystem (e.g., an AF system) according to a second preferred embodiment of the present invention.
Figure 6B:
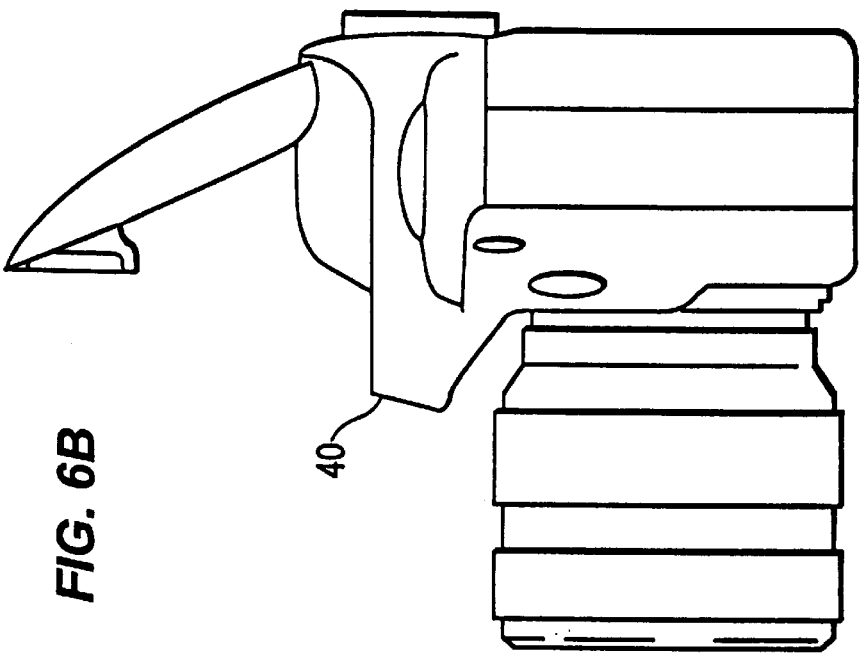
FIG. 6B is a diagram that illustrates a side view of the camera depicted in FIG. 6A.
Figure 6A:
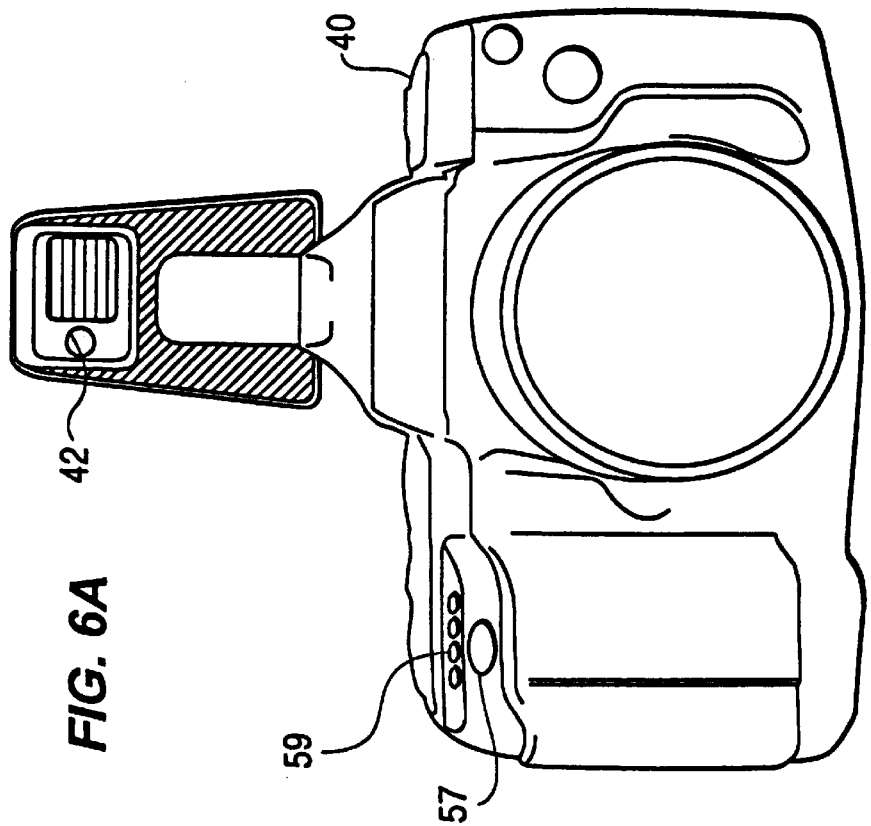
FIG. 6A is a diagram that illustrates a front view of a camera which incorporates the structures illustrated in FIG. 5.

A second preferred embodiment of the present invention is illustrated in FIGS. 5, 6A and 6B to which reference is now made. In particular, in FIG. 5, an apparatus for controlling a light source used in conjunction with an AF subsystem of a camera is illustrated. More particularly, the collector of a transistor 43 is connected to the positive pole side of a battery 41 via a light emitting diode 42 within a camera 40. Light emitting diode 42 constitutes a light source that may be used in accordance with the present invention to emit AF illumination light to facilitate AF operations, especially during otherwise poor lighting conditions. As shown in FIG. 6A, light emitting diode 42 may be arranged adjacent to a "flip-up" type flash unit which is also built into camera 40.

The emitter of transistor 43 (FIG. 5) is connected to the ground connection side of battery 41 via series-connected resistors 46 and 48. Moreover, the emitter of transistor 43 is connected to the voltage input terminal of a control circuit 44. The output terminal of control circuit 44 is connected to the base of transistor 43. A light emission signal for AF illumination light, for example, is applied to the control input of control circuit 44 from camera-side microprocessor 45.

Moreover, the collector of a transistor 49 is connected to the junction point of resistor 46 and resistor 48. The emitter of transistor 49 is connected to a ground connection of battery 41. Moreover, the base of transistor 49 is connected to a respective terminal of a resistor 50 and a resistor 51. The other terminal of resistor 50 is connected to the ground connection of battery 41. The other terminal of resistor 51 is connected to output terminal A of camera-side microprocessor 45.

The base of a transistor 53 and one end of a resistor 54 are connected via a resistor 52 in series to the output terminal B of camera-side microprocessor 45. The emitter of transistor 53 and the other end of the resistor 54 are connected to the positive side of a power supply circuit (not shown).

The collector of transistor 53 is connected to ground via the direction of light emission of a light emitting diode 56 in series with a current-limiting resistor 56. Light emitting diode 55 is arranged within a viewfinder of camera 40 to constitute a portion of a display member.

A release button 57 (e.g., shutter release button, imaging device image initiation button, etc.), a focus detection unit 58 arranged in the lower portion of a mirror box (not particularly identified), and an operating unit 59 arranged on the left-hand, upper surface of camera 40 (FIGS. 6A and 6B), are connected to camera-side microprocessor 45, respectively.

Accordingly, in FIG. 5, an AF illumination light source includes light emitting diode 42, and a light source reduction unit or reducer includes resistor 48, transistor 49, and operating unit 59. Such a light source reduction unit is operative to control transistor 49 according to an operation setting or parameter set and defined by a user (e.g., a photographer) in accordance with operation of operating unit 59 and camera-side microprocessor 45.

In operation, and in the case that a photographer desires to reduce the amount of light emitted by light emitting diode 42 during AF illumination operations (as opposed to completely turning a light source off which may be done in regard to the preferred embodiment shown in FIGS. 2–4.), the photographer may operate operating unit 59 (FIG. 6A). In turn, camera-side microprocessor 45 will sense such a setting operation and set an internal flag which represents a light reduction mode within camera-side microprocessor 45. As such, the output terminal of camera-side microprocessor 45 may be set to undergo a potential change based on the state of the internal flag; when in a light reduction mode, it becomes a low level, and when in a normal light generation mode it becomes a high level.

Normally, in an AF photography mode, for example, microprocessor 45 monitors signals corresponding to a pair of optical image output signals from focus detection unit 58. When such signals (e.g., corresponding to subject contrast or focus detection accuracy) are less than a threshold value, camera-side microprocessor 45 applies a light emission signal for AF illumination light to control circuit 44.

When control circuit 44 receives the light emission signal from microprocessor 45, control circuit 44 releases an output voltage (e.g., originally set to a ground potential) for a fixed period of time. During such a period, control circuit 44 applies a return-to-base voltage to transistor 43 such that the emitter voltage of transistor 43 coincides with a reference voltage. As a result, the emitter of transistor 43 is maintained at a reference voltage during the fixed period of time.

In the case of normal light emission by light emitting 42 diode to facilitate AF operations, for example, transistor 49 is maintained in a conducting state via output terminal A. As such, the emitter current of transistor 43 flows to the ground side of battery 41 through resistor 46 and the collector-emitter path of transistor 49. As a result, a relatively large current flows to light emitting diode 42 via the collector of transistor 43 to cause light emitting diode to generate a relatively bright AF illumination light to facilitate AF operations, especially during otherwise poor lighting conditions.

In the case of an AF illumination light reduction mode (whereby the brightness of light emitting diode 42 will be controlled), transistor 49 is maintained in a non-conducting state via output terminal A. As such, the emitter current of transistor 43 flows to the ground side of battery 41 via resistor 46 and resistor 48. As a result, a relatively small current is allowed to flow into light emitting diode 42 which thereby generates relatively faint AF illumination light to facilitate AF operations.

As such, focus detection unit 58 performs focus detection based on a projected pattern caused by the relatively faint AF illumination light, and regardless of the light reduction mode. Accordingly, focus detection unit 58 is capable of focus detection even if the luminosity generated by light emitting diode 42 is about 1 candle power. Nevertheless, because focus detection accuracy is slightly reduced during a light reduction mode provided in accordance with the present invention (e.g., where a light emitting diode or other light source generates a relatively dim amount of AF illumination light) it is preferable to make the focus recognition range slightly wider, etc.

It should be noted that when release button 57 is depressed half-way and camera 40 is in a AF light reduction mode, output terminal B of camera-side microprocessor 45 may be caused to change from a high level to a low level, thereby permitting transistor 53 to conduct and light emitting diode 55 to illuminate within a viewfinder of camera 40. By illuminating light emitting diode 55, a photographer can confirm the emission of reduced AF illumination light, etc. Additionally, because the intensity of emitted AF illumination may be controlled, a reduction in focus detection accuracy, and a slowing of focus detection operations can be avoided.

Figure 7:
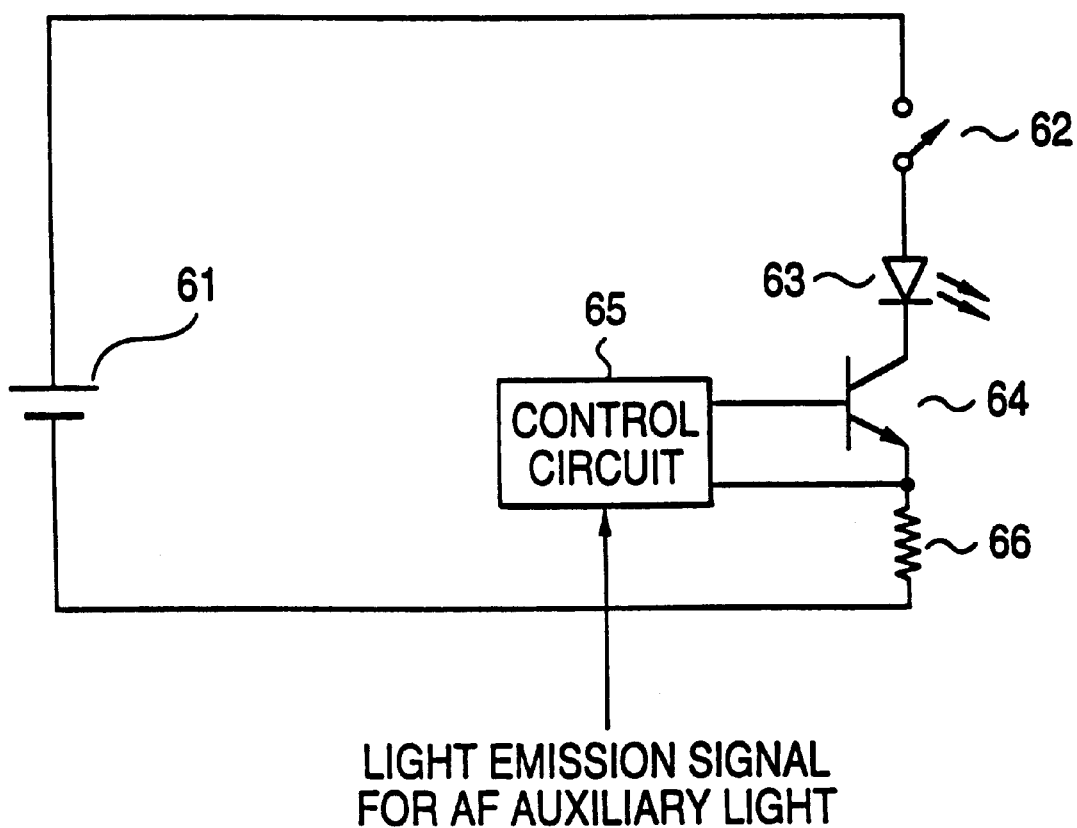
FIG. 7 is a block diagram of an apparatus for controlling a light source used in conjunction with a camera subsystem (e.g., an AF system) according to a third preferred embodiment of the present invention.

In the above-described preferred embodiments, termination or reduction of AF illumination light is caused through corresponding control by microprocessors 18 and 45. However, the present is not so restricted. For example, as shown in FIG. 7, a switch 62 may be provided to allow a user (e.g., a photographer, etc.) to define or select an operating parameter to cause termination of a current path of light emitting diode 63 which emits AF illumination light. Moreover, a switch may be provided to short-circuit both ends of a light emitting diode which emits illumination light to facilitate subsystem or feature (e.g., AF subsystem) operations.

Also, it should be noted that although a light emitting diode has been used as a light source in the preferred embodiments described above, the present invention is not so restricted. Generally speaking, any light emitting device whose emission characteristics may be controlled (e.g., dimmed, etc.) may be employed. For example, a light bulb, etc. may be used as a light source.

It should also be noted that the preferred embodiments described above are merely exemplary and, in particular, the placement of the structures described above may be moved to alternate locations within a camera, an electronic flash device or other imaging device peripheral. And, it should also be noted that although a film-based camera has been shown and described with regard to several preferred embodiments of the present invention, the present invention is not so restricted. To the contrary, other imaging devices such as video cameras, digital still-cameras, etc. may take advantage of the novel features and aspects of the present invention to incorporate systems and processes that utilize a light source to facilitate their operations (e.g., red-eye reduction systems, self-timers etc.).

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. An apparatus for controlling a light source used in conjunction with the operation of an imaging device, comprising:

a light source configured to emit light in relation to the operation of a subsystem of said imaging device, wherein said subsystem assists an imaging function of said imaging device;

a light source control unit which controls an amount of light emitted by said light source based on a user-defined operating parameter; and an indicator that provides a visual indication of said amount of light emitted by said light source.

2. The apparatus according to claim 1, wherein said light source is disposed in an electronic flash device adapted to be used in conjunction with said imaging device, said light source control unit being disposed in said imaging device.

3. The apparatus according to claim 1, wherein said imaging device is a camera.

4. The apparatus according to claim 1, wherein said user-defined operating parameter is a selection parameter corresponding to an ON/OFF state associated with said light source.

5. The apparatus according to claim 1, wherein said light source control unit controls the brightness of said light source.

6. The apparatus according to claim 1, wherein said subsystem remains operable after said light source control unit controls said amount of light emitted by said light source.

7. The apparatus according to claim 1, wherein said light source and said light source control unit are disposed in said imaging device.

8. The apparatus according to claim 1, wherein said subsystem of said imaging device is an automatic focussing system configured to automatically set a focus state of an optical system of said imaging device in accordance with said amount of light.

9. The apparatus according to claim 1, wherein said subsystem of said imaging device is a self-timer system configured to delay imaging of a subject by said imaging device, said light source operable to emit light to indicate the operation of said self-timer system.

10. The apparatus according to claim 1, wherein said subsystem of said imaging device is a red-eye reduction unit configured to avoid red-eye results in an image generated by said imaging device, said light source operable to emit light to indicate the operation of said redeye reduction system.

11. A camera, comprising:

a subsystem configured to affect the operation of the camera, wherein said subsystem assists the imaging function of said camera;

a light source configured to emit light in relation to the operation of said subsystem;

a light source control unit configured to control an amount of light emitted by said light source based on a user-defined operating parameter; and an indicator that provides a visual indication of said amount of light emitted by said light source.

12. The camera according to claim 11, wherein said user-defined operating parameter is a selection parameter corresponding to an ON/OFF state associated with said light source.

13. The camera according to claim 11, wherein said subsystem remains operable to affect the operation of said camera after said light source control unit controls said amount light emitted by said light source.

14. The camera according to claim 11, wherein said information device includes a light emitting diode that illuminates to provide said visual indication.

15. A method for controlling a light source used in conjunction with the operation of a camera, comprising the steps of:

enabling a light source to emit light in relation to a subsystem of said camera, wherein said subsystem assisting in imaging operations within said camera;

controlling an amount of light emitted by said light source based on a user defined operating parameter; and indicating the amount of said light emitted by said light source.

16. The method according to claim 15, wherein said controlling step further includes the step of preventing said light source from emitting light.

17. The method according to claim 15, wherein said amount of light is less than a normal amount of light capable of being emitted by said light source.

18. The method according to claim 15, wherein said subsystem of said camera remains operable after said light source is controlled during said controlling step.

* * * * *